(12) United States Patent
Guo et al.

(10) Patent No.: US 11,970,065 B2
(45) Date of Patent: Apr. 30, 2024

(54) VEHICLE CONTROL DEVICE, VEHICLE CONTROL SYSTEM AND VEHICLE

(71) Applicant: Great Wall Motor Company Limited, Hebei (CN)

(72) Inventors: Tengfei Guo, Hebei (CN); Zelin Gao, Hebei (CN); Wei Meng, Hebei (CN); Pengfei Xing, Hebei (CN); Chao Zhao, Hebei (CN)

(73) Assignee: Great Wall Motor Company Limited, Hebei (CN)

( * ) Notice: Subject to any disclaimer, the term of this patent is extended or adjusted under 35 U.S.C. 154(b) by 146 days.

(21) Appl. No.: 17/640,614

(22) PCT Filed: Sep. 9, 2020

(86) PCT No.: PCT/CN2020/114120
§ 371 (c)(1),
(2) Date: Mar. 4, 2022

(87) PCT Pub. No.: WO2021/082748
PCT Pub. Date: May 6, 2021

(65) Prior Publication Data
US 2022/0340009 A1  Oct. 27, 2022

(30) Foreign Application Priority Data
Oct. 31, 2019 (CN) .......................... 201911052991.7

(51) Int. Cl.
*B60L 3/00* (2019.01)
*B60R 21/0136* (2006.01)

(52) U.S. Cl.
CPC ........ *B60L 3/0007* (2013.01); *B60R 21/0136* (2013.01)

(58) Field of Classification Search
CPC .. B60L 3/0007; B60R 21/0136; B60R 21/013
(Continued)

(56) References Cited

U.S. PATENT DOCUMENTS 8,892,312 B2 * 11/2014 Inagaki .................... B60L 3/04
180/274
9,889,741 B1  2/2018 Tajima
9,954,548 B2 * 4/2018 Illing .................... H03M 1/367

FOREIGN PATENT DOCUMENTS

| CN | 201385585 Y | 1/2010 |
| CN | 102069717 A | 5/2011 |

(Continued)

OTHER PUBLICATIONS

International Search Report for Application No. PCT/CN2020/114120 mailed Dec. 8, 2020.

*Primary Examiner* — Hal Kaplan
(74) *Attorney, Agent, or Firm* — Renner, Otto, Boisselle & Sklar, LLP (57) ABSTRACT

A vehicle control device, a vehicle control system and a vehicle are provided in the embodiments of the present disclosure, the vehicle control device includes a first resistor circuit, a comparator, a control switch, and a second resistor circuit; the comparator is configured to receive a first voltage from the air bag module and output a high level signal to the control switch to enable the control switch to be switched on according to the high level signal, enable a battery management system to be grounded after the control switch is switched on, and enable the battery management system to be powered off after the battery management system is grounded, where the first voltage is sent out by the air bag module when a vehicle collision event is detected.

15 Claims, 3 Drawing Sheets

(58) Field of Classification Search
USPC .................................................. 307/9.1, 10.1
See application file for complete search history.

(56) References Cited

FOREIGN PATENT DOCUMENTS

| | | |
|---|---|---|
| CN | 202480896 U | 10/2012 |
| CN | 104494544 A | 4/2015 |
| CN | 105150854 A | 12/2015 |
| CN | 205168210 U | 4/2016 |
| CN | 107276013 A | 10/2017 |
| CN | 109910807 A | 6/2019 |
| CN | 110103716 A | 8/2019 |
| EP | 2364883 A | 11/2013 |
| KR | 20050007083 A | 9/2011 |

* cited by examiner

PRIOR ART

FIG. 4

VEHICLE CONTROL DEVICE, VEHICLE CONTROL SYSTEM AND VEHICLE

CROSS-REFERENCE TO RELATED APPLICATION

This application is a National Stage of International Application No. PCT/CN2020/114120 filed on Sep. 9, 2020, which claims priority to Chinese Patent Application No. 201911052991.7 filed on Oct. 31, 2019, and entitled "vehicle control device, vehicle control system and vehicle", the entire contents of which are incorporated herein by reference for all purposes.

TECHNICAL FIELD

The present disclosure relates to the technical field of vehicles, and particularly relates to a vehicle control device, a vehicle control system and a vehicle.

BACKGROUND

With the development and progress of society, vehicles have become the tools that are necessary for people to go out; as people are focusing on energy and environment, electric vehicles start to be applied and developed. When an electric vehicle collides, the electric vehicle needs to be controlled to be powered off, so that the electric vehicle is no longer moving, and the safety of a driver is ensured.

In the prior art, when an air bag module recognizes that the vehicle collides, a CAN signal can be sent to a vehicle control unit and a battery management system through a controller area network (Controller Area Network, CAN) bus, and the CAN signal represents collision of the vehicle, such that the battery management system is enabled to switch off power supply according to the CAN signal, thereby enabling the vehicle to be powered off.

However, in the prior art, due to the fact that CAN signal is instable, and the CAN signal can be interfered when the vehicle is collided, and a transmission rate of the CAN signal is slower, such that the battery management system cannot receive the CAN signal, too, and the battery management system cannot receive the CAN signal in time, thus, the battery management system cannot timely switch off the power supply, the vehicle cannot be stopped in time, and the safety of the driver cannot be guaranteed.

SUMMARY

The embodiments of the present disclosure provide a vehicle control device, a vehicle control system and a vehicle, which aims at solving a problem that the battery management system cannot power off the power supply in time currently when a vehicle collides.

In the first aspect, a vehicle control device is provided in one embodiment of the present disclosure, the vehicle control device includes:
a first resistor circuit, a comparator, a control switch, and a second resistor circuit;
where a first terminal of the comparator is connected with an air bag module, a second terminal of the comparator is connected with a first terminal of the first resistor circuit, a third terminal of the comparator is connected with a power supply, a fourth terminal of the comparator is grounded, and a fifth terminal of the comparator is connected with a first terminal of the control switch;
a second terminal of the control switch is connected with a battery management system, and a third terminal of the control switch is grounded;
a second terminal of the first resistor circuit is connected with the power supply, and a third terminal of the first resistor circuit is grounded;
a first terminal of the second resistor circuit is connected with the power supply, and a second terminal of the second resistor circuit is connected with the battery management system;
the comparator is configured to receive a first voltage from the air bag module and output a high level signal to the control switch to enable the control switch to be switched on according to the high level signal, enable the battery management system to be grounded after the control switch is switched on, and enable the battery management system to be powered off after the battery management system is grounded, wherein the first voltage is sent out by the air bag module when a vehicle collision event is detected.

In one preferable embodiment, when the first terminal of the comparator is a non-inverting input and the second terminal of the comparator is an inverting input, the first voltage is higher than a second voltage, and the second voltage is a voltage input from the first terminal of the first resistor circuit to the second terminal of the comparator; when the first terminal of the comparator is an inverting input, and the second terminal of the comparator is a non-inverting input, the first voltage is lower than the second voltage.

In one preferable embodiment, the comparator is further configured to receive a third voltage from the air bag module and output a low level signal to the control switch, so that the control switch is controlled to be switched off according to the low level signal, and the battery management system is powered by the power supply after the control switch is switched off, wherein the third voltage is sent out by the air bag module when the vehicle collision event is not detected by the air bag module;
where when the first terminal of the comparator is a non-inverting input, the second terminal of the comparator is an inverting input, the third voltage is less than the second voltage; when the first terminal of the comparator is an inverting input, the second terminal of the comparator is a non-inverting input, the third voltage is higher than the second voltage.

In one preferable embodiment, the first resistor circuit includes a first resistor and a second resistor;
where a first terminal of the first resistor is connected with the power supply, a second terminal of the first resistor is connected with the first terminal of the second resistor, and a second terminal of the second resistor is grounded;
the second terminal of the comparator is connected between the first resistor and the second resistor.

In one possible embodiment, the comparator includes a comparator circuit and a third resistor;
where a first terminal of the comparator circuit is connected with the air bag module, a second terminal of the comparator circuit is connected with the first terminal of the first resistor circuit, a third terminal of the comparator circuit is connected with a first terminal of the third resistor, a fourth terminal of the comparator circuit is grounded, and a fifth terminal of the comparator circuit is connected with a second terminal of the third resistor; the third terminal of the comparator circuit is connected with the power supply, and the fifth terminal of the comparator circuit is connected with the first terminal of the control switch.

In one preferable embodiment, the vehicle detection device further includes a first port configured to be grounded;

where the third terminal of the first resistor circuit, the fourth terminal of the comparator and the third terminal of the control switch are commonly connected with the first port configured to be grounded;

the comparator is configured to output a high level signal to the control switch, so that the control switch is enabled to turn on the first port configured to be grounded and the battery management system according to the high level signal received from the comparator;

the vehicle control device further includes a second port configured to be connected with the battery management system;

where the second terminal of the second resistor circuit and the second terminal of the control switch are commonly connected with the second port;

the vehicle control device further includes a third port configured to be connected with the power supply, and a fourth port configured to be connected with the air bag module;

where the third terminal of the comparator, the second terminal of the first resistor circuit and the first the final of the second resistor circuit are commonly connected with the third port;

the first terminal of the comparator is connected with the fourth port.

In one preferable embodiment, the control switch is a triode;

as an alternative, the control switch is an optical coupler which further includes a fourth terminal, where the fourth terminal of the optical coupler is grounded.

In the second aspect, a vehicle control system is disclosed in one embodiment of the present disclosure, the vehicle control system includes: an air bag module, a power supply, and the vehicle control device described in the first aspect and all possible embodiments in the first aspect;

where the air bag module is configured to output a first voltage to the vehicle control device to switch off the battery management system through the vehicle control device when a vehicle collision event is detected;

where when a first terminal of a comparator in the vehicle control device is a non-inverting input, and a second terminal of the comparator in the vehicle control device is an inverting input, the first voltage is higher than a second voltage, and the second voltage is a voltage which is input from a first terminal of a first resistor circuit in the vehicle control device to a second terminal of the comparator; when the first terminal of the comparator in the vehicle control device is an inverting input, and the second terminal of the comparator in the vehicle control device is a non-inverting input, the first voltage is lower than the second voltage.

In one preferable embodiment, the air bag module is further configured to output a third voltage to the vehicle control device, so that the battery management system is enabled to receive power supply from the power supply through the vehicle control device, when a vehicle collision event is not detected by the air bag module;

where when the first terminal of the comparator in the vehicle control device is a non-inverting input, and the second terminal of the comparator in the vehicle control device is an inverting input, the third voltage is higher than the second voltage; when the first terminal of the comparator in the vehicle control device is an inverting input, and the second terminal of the comparator in the vehicle control device is a non-inverting input, the third voltage is higher than the second voltage.

In the third aspect, a vehicle is disclosed in one embodiment of the present disclosure, where the vehicle is provided with the vehicle control system described in the second aspect and all possible embodiments in the second aspect.

A vehicle control device, a vehicle control system and a vehicle are provided in the embodiments of the present disclosure. The vehicle control device includes a first resistor circuit, a comparator, a control switch, and a second resistor circuit; the comparator is used to receive the first voltage sent by the air bag module when a vehicle collision event is detected, and output a high level signal to the control switch, so that the control switch is controlled to be turned on according to the high level signal, the battery management system is enabled to be grounded after the control switch is turned on, the battery management system is powered off after it is grounded, so that the battery management system can quickly cut off the power supply of the vehicle and is not influenced by signal interference, time required for switching off the control switch is reduced, and the reliability of the vehicle control device is improved.

BRIEF DESCRIPTION OF THE DRAWINGS

In order to describe the embodiments of the present disclosure or technical solutions in the prior art more clearly, a brief introduction regarding the accompanying drawings that need to be used for describing the embodiments or the prior art is given below; it is obvious that the accompanying drawings described below are only some embodiments of the present disclosure, the person of ordinary skill in the art may also obtain other drawings according to these drawings without paying creative labor.

Reference numerals are listed below:
100—first resistor circuit;
200—comparator;
300—control switch;
400—second resistor circuit;
500—air bag module;
600—battery management system;
R1—first resistor;
R2—second resistor;
R3—third resistor;
R4—fourth resistor;
P1—first port;
P2—second port;
P3—third port;
P4—fourth port;
A—comparator circuit;
Q—triode;
U—optical coupler.

DETAILED DESCRIPTION OF THE EMBODIMENTS

The technical solutions in the embodiments of the present disclosure will be described clearly and comprehensively with reference to accompanying drawings in the embodiments, it is obvious that, the embodiments described below are only some embodiments of the present disclosure rather than the entirety of the embodiments. Based on the embodiments in the present disclosure, some other embodiments, which are obtained by the person of ordinary skill in the art without paying creative labor, are all included in the protection scope of the present application.

Terms such as "first", "second", "third", "fourth", and the like (if present) in the specification, the claims and the figures of the present disclosure are used to distinguish similar objects without the need to describe a particular order or order of sequence. It should be understood that the data used in this way may be interchanged where appropriate, so that the embodiments of the present disclosure described herein can be implemented in an order other than those illustrated or described herein. Furthermore, the terms such as "comprising" and "having" and any variations thereof are interpreted to cover non-exclusive inclusion, for example, processes, methods, systems, products or devices which contain a series of steps or units are not necessarily limited to the explicitly listed steps or units; instead, these processes, methods, systems, products or devices may include other steps or units that are not explicitly listed or inherent to these processes, methods, products or devices.

In order to describe the technical solutions of the present disclosure, the technical solutions of the present disclosure are described in detail below with reference to the specific embodiments, the specific embodiments described below can be combined with each other, with respect to the same or similar concepts or processes, these concepts or processes may not be repeatedly described in some embodiments.

Figure 1:
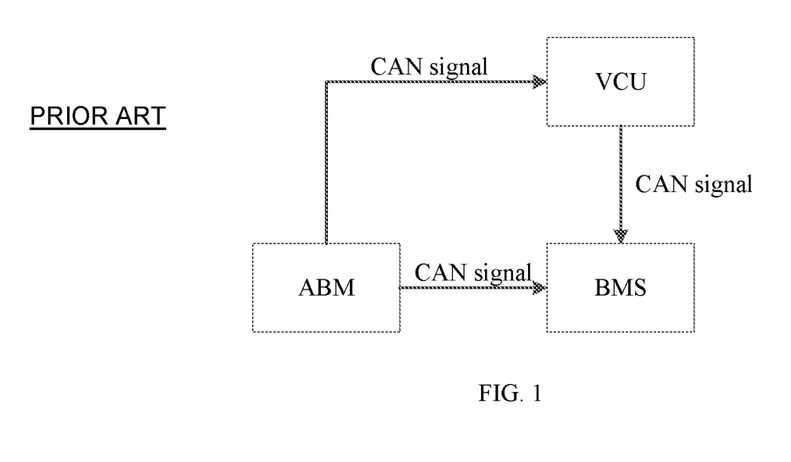
FIG. 1 illustrates a schematic block diagram of the existing vehicle control technology.

FIG. 1 is a schematic block diagram of an existing vehicle control technology. In FIG. 1, ABM represents an air bag module (Air Bag Module, ABM), VCU represents a vehicle control unit (Vehicle Control Unit, VCU), BMS represents a battery management system (Battery Management System, BMS). As shown in FIG. 1, in the prior art, when the ABM detects a vehicle collision event, a message is sent to the VCU and the BMS at the same time in the form of CAN signal, after the message is received, the BMS waits for a plurality of cycles to confirm that the vehicle collision event is valid, and then controls a battery contactor to be switched off, so that the vehicle is powered off. A time period from the time when ABM sends the vehicle collision event to the time when the vehicle is powered off requires more than 100 ms. Moreover, the CAN signal is prone to interference, there is a certain instability. If the BMS does not receive the CAN signal sent by the ABM, the BMS may still receive the CAN signal sent by the VCU, so that the BMS controls the battery contactor to be switched off.

However, in the prior art, due to the fact that the CAN signal is instable, and the CAN signal can be interfered when the vehicle is collided, a transmission rate of the CAN signal is slow, so that the battery management system cannot receive the CAN signal in time, so that the battery management system cannot turn off the power supply in time, the vehicle cannot be stopped in time, and the safety of the driver cannot be guaranteed.

Figure 2:
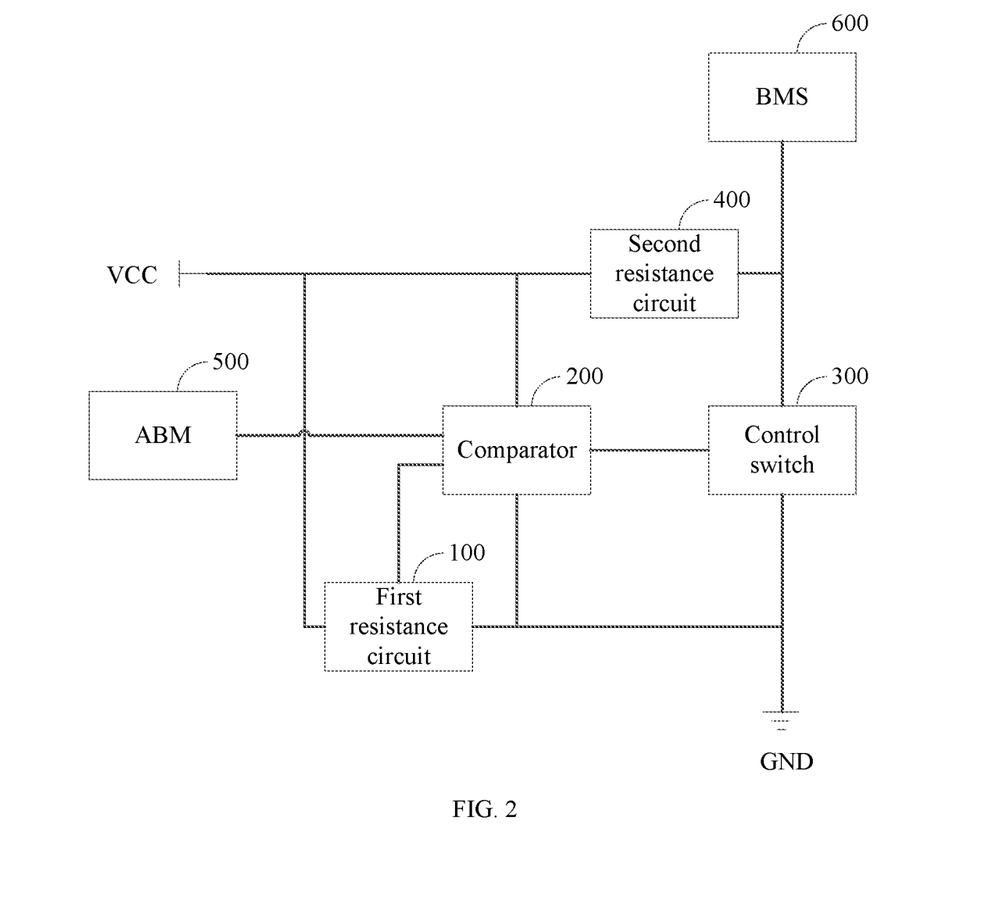
FIG. 2 illustrates a schematic block diagram of a vehicle control device according to one embodiment of the present disclosure.

In this regard, one embodiment of the present disclosure provides a vehicle control device, a vehicle control system, and a vehicle. The vehicle control device includes a first resistor circuit 100, a comparator 200, a control switch 300, and a second resistor circuit 400; the comparator 200 is used to receive a first voltage when the ABM 500 detects a vehicle collision event of the vehicle, and output a high level signal to the control switch 300, so that the control switch 300 is controlled to be turned on according to the high level signal, the battery management system 600 is grounded after the control switch 300 is turned on, and the battery management system 600 is powered off after it is grounded, so that the battery management system 600 can quickly cut off the power supply of the vehicle without being affected by signal interference, the time required for switching on/off the control switch 300 is reduced, and the reliability of the vehicle control device is improved.

FIG. 2 is a schematic circuit configuration of a vehicle control device according to one embodiment of the present disclosure. Referring to FIG. 2, the vehicle control device according to this embodiment includes a first resistor circuit 100, a comparator 200, a control switch 300, and a second resistor circuit 400.

A first terminal of the comparator 200 is connected with the air bag module 500, the second terminal of the comparator 200 is connected with a first terminal of the first resistor circuit 100, a third terminal of the comparator 200 is connected with a power supply, a fourth terminal of the comparator 200 is grounded, and a fifth terminal of the comparator 200 is connected with a first terminal of the control switch 300. A second terminal of the control switch 300 is connected with the battery management system 600, and a third terminal of the control switch 300 is grounded.

A second terminal of the first resistor circuit 100 is connected with the power supply, and a third terminal of the first resistor circuit 100 is grounded. A first terminal of the second resistor circuit 400 is connected with the power source, and a second terminal of the second resistor circuit 400 is connected with the battery management system 600.

The comparator 200 is configured to receive the first voltage from the air bag module 500 and output a high level signal to the control switch 300, the battery management system 600 is grounded after the control switch 300 is turned on, and the battery management system 600 is powered off after it is grounded; where the first voltage is sent out when the air bag module 500 detects the vehicle collision event of the vehicle.

In this embodiment, the third terminal of the comparator 200, the second terminal of the first resistor circuit 100 and the first terminal of the second resistor circuit 400 are commonly connected with the power supply, and volt current condenser (Volt Current Condenser, VCC) in FIG. 2 represents the power supply which is used for supplying power to the vehicle control device. The comparator 200 includes at least five terminals. The first port and the second ports are input ports used for receiving two voltage signals to be compared; the third terminal is a power terminal of the comparator 200, the fourth terminal is a port configured to be grounded of the comparator 200; and the fifth terminal is an output terminal of the comparator 200. The second terminal of the comparator 200 is connected with a second voltage obtained by dividing the first resistor circuit 100, the second voltage is used as a reference voltage, the first terminal of the comparator 200 receives the voltage output by the air bag module 500. The comparator 200 generates a corresponding level signal by comparing the voltage output by the air bag module 500 and the second voltage, and outputs the level signal to the control switch 300. The comparator 200 can either be implemented by multiple circuit components or be implemented by a single integrated circuit chip, implementation of the comparator is not limited herein, for example, the comparator can be chip with a product model of LM393 or LM239.

The control switch 300 includes at least three terminals. The first terminal of the control switch 300 receives a level signal output by the comparator 200, the second terminal of the control switch 300 is connected with the battery management system 600, and the third terminal of the control switch 300 is grounded. The control switch 300 controls a circuit path between the second terminal and the third terminal to be switched on/off according to the level signal output by the comparator 200, thereby controlling the battery management system 600 to be grounded according to switching on/off of the circuit path between the second terminal and the third terminal. A specific circuit of the control switch 300 is not limited herein, for example, the control switch 300 may be a triode, an optical coupler, etc.

The vehicle control device provided by this embodiment of the present disclosure includes a first resistor circuit 100, a comparator 200, a control switch 300 and a second resistor circuit 400; the comparator 200 outputs a high level signal to the control switch 300, so that the control switch 300 is controlled to be switched on according to the high level signal, after the control switch is switched on, the battery management system 600 is grounded, after the battery management system is grounded, the battery management system 600 is powered off, so that the battery management system 600 can quickly cut off power supply of the vehicle without being affected by signal interference, time required for switching on/off the control switch 300 is reduced, and the reliability of the vehicle control device is improved.

In one embodiment, when the first terminal of the comparator 200 is a non-inverting input, the second terminal of the comparator 200 is an inverting input, the first voltage is higher than the second voltage, the second voltage is the voltage which is input from the first terminal of the first resistor circuit 100 to the second terminal of the comparator 200. When the first terminal of the comparator 200 is an inverting input, the second terminal of the comparator 200 is a non-inverting input, the first voltage is lower than the second voltage.

In this embodiment, the first terminal of the comparator 200 may be a non-inverting input, and the second terminal is an inverting input; as an alternative, the first terminal may be an inverting input, and the second terminal is a non-inverting input, the first terminal and the second terminal of the comparator 200 are not limited herein. The vehicle control device may be implemented by one of two implementations listed below:

In a first implementation of the comparator 200, when the first terminal of the comparator 200 is a non-inverting input and the second terminal of the comparator 200 is an inverting input, if the vehicle collides, the air bag module 500 detects a vehicle collision event and outputs a first voltage to the control switch 300. Where, the first voltage is higher than the second voltage. The comparator 200 is configured to compare the first voltage received from the non-inverting input with the second voltage received from the inverting input, since the first voltage is higher than the second voltage, the comparator 200 outputs a high level signal to the control switch 300, the control switch 300 receives the high level signal and then turns on the circuit path between the second terminal thereof and the third terminal thereof, so that the battery management system 600 is grounded, the battery management system 600 controls a battery contactor to be switched off, so that the vehicle is powered off.

In a second implementation of the comparator 200, the first terminal of the comparator 200 is an inverting input, and the second terminal of the comparator 200 is a non-inverting input. If the vehicle is collided, the air bag module 500 detects a vehicle collision event, and outputs a first voltage to the control switch 300. Where, the first voltage is lower than the second voltage. The comparator 200 is configured to compare the first voltage received from the non-inverting input with the second voltage received from the inverting input, since the first voltage is lower than the second voltage, thus, the comparator 200 outputs a high level signal to the control switch 300, the control switch 300 receives the high level signal and then turns on the circuit path between the second terminal thereof and the third terminal thereof, so that the battery management system 600 is grounded, the battery management system 600 controls the battery contactor to be switched off, so that the vehicle is powered off.

In one embodiment, the comparator 200 is further configured to receive a third voltage from the air bag module 500, and outputs a low level signal to the control switch 300 to enable the control switch 300 to be switched off according to the low level signal, the battery management system 600 is powered by the power supply after the control switch 300 is switched off, where the third voltage is sent out by the air bag module 500 when a vehicle collision event does not occur.

When the first terminal of the comparator 200 is a non-inverting input, and the second terminal of the comparator 200 is an inverting input, the third voltage is lower than the second voltage; when the first terminal of the comparator 200 is an inverting input, and the second terminal of the comparator 200 is a non-inverting input, the third voltage is higher than the second voltage.

In this embodiment, the first terminal of the comparator 200 may be a non-inverting input, and the second terminal may be an inverting input; as an alternative, the first terminal may be an inverting input, and the second terminal may be a non-inverting input, the first terminal and the second terminal of the comparator 200 are not limited herein. The first terminal and the second terminal of the comparator 200 are respectively described herein.

When the first terminal of the comparator 200 is a non-inverting input and the second terminal of the comparator 200 is an inverting input, when vehicle collision event does not occur, the air bag module 500 detects that the vehicle does not collide, and outputs the third voltage to the comparator 200, where the third voltage is lower than the second voltage. The comparator 200 is configured to compare the third voltage received from the non-inverting input with the second voltage received from the inverting input, since the third voltage is lower than the second voltage, thus, the comparator 200 outputs a low level signal to the control switch 300, the control switch 300 receives the low level signal and then switches off the circuit path between the second terminal thereof and the third terminal thereof, so that the battery management system 600 is enabled to receive power from the power supply, the battery management system 600 controls the battery contactor to be switched off, so that the vehicle is powered on. Where the specific value of the third voltage is not limited herein as long as the third voltage is less than the second voltage, the value of the third voltage may be assigned as 0, when the value of the third voltage is not equal to 0, the air bag module 500 continuously outputs the third voltage to the comparator 200 to ensure that the vehicle can be powered on in the event that the vehicle collision event does not occur.

When the first terminal of the comparator 200 is an inverting input, and the second terminal is a non-inverting input, when the vehicle does not collide, the air bag module 500 fails to detect a vehicle collision event, and thus outputs the third voltage to the comparator 200, where the third voltage is higher than the second voltage. The comparator 200 is configured to compare the third voltage received from the non-inverting input with the second voltage received from the inverting input, since the third voltage is higher than the second voltage, thus, the comparator 200 outputs a low level signal to the control switch 300, the control switch 300 receives the low level signal and then switches off the circuit path between the second terminal thereof and the third terminal thereof, so that the battery management system 600 receives the power supply, and the battery management system 600 controls the battery contactor to be switched off, and thus the vehicle is enabled to be powered on. The specific value of the third voltage is not limited herein, as long as the assigned third voltage is higher than the second voltage. The air bag module 500 continuously outputs the third voltage to the comparator 200 to ensure that the vehicle can be powered on in the event that the vehicle collision event does not occur.

Figure 3:
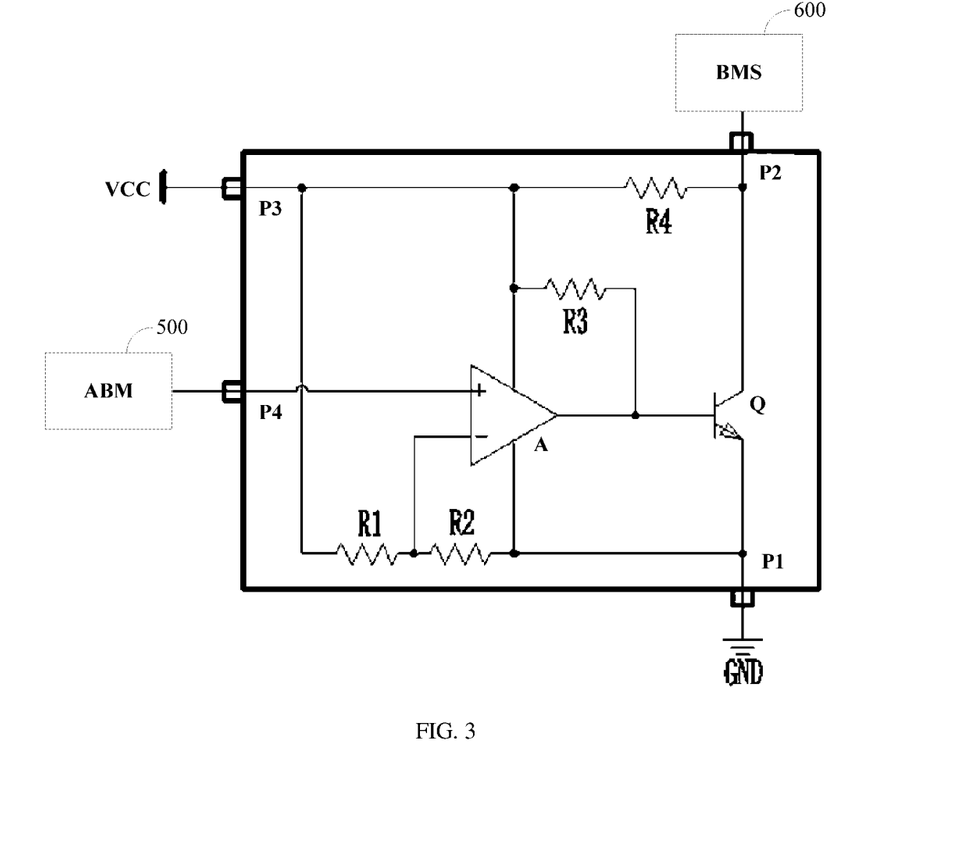
FIG. 3 illustrates a schematic circuit configuration of a vehicle control device according to another embodiment of the present disclosure.

FIG. 3 is a schematic circuit configuration of a vehicle control device according to another embodiment of the present disclosure. In FIG. 3, the control switch 300 illustrated as a triode Q is taken as an example, however, the circuit topology of the control switch 300 is not limited thereto. The first terminal of the triode Q is a base electrode, the second terminal of the triode Q is a collector electrode, and the third terminal of the triode Q is an emitting electrode. When the base electrode receives a high level signal, the triode Q is turned on, that is, a circuit path between the collector electrode and the emitting electrode is turned on. When the base electrode receives a low level signal, the triode Q is switched off, that is, the circuit path between the collector electrode and the emitting electrode is switched off. Referring to FIG. 3, in one embodiment, the first resistor circuit 100 includes a first resistor R1 and a second resistor R2.

A first terminal of the first resistor R1 is connected with a power supply, a second terminal of the first resistor R1 is connected with a first terminal of the second resistor R2, and a second terminal of the second resistor R2 is grounded.

A second terminal of the comparator 200 is connected between the first resistor R1 and the second resistor R2.

In this embodiment, the first resistor R1 and the second resistor R2 are connected in series between the power supply and GND, so that the voltage of the power supply is divided and a second voltage is obtained. The second terminal of the comparator 200 is connected between the first resistor R1 and the second resistor R2, and the second voltage is connected with the second terminal of the comparator 200. The second voltage may be obtained as a reference voltage through voltage division of the first resistor R1 and the second resistor R2 and is compared with the voltage output by the air bag module 500. The resistor values of the first resistor R1 and the second resistor R2 are not limited herein, they may be determined according to actually required value of the second voltage and the value of the voltage of the power supply.

Optionally, the first resistor R1 and the second resistor R2 may be adjustable divided resistors configured to adjust an input voltage of the second terminal of the comparator 200 according to the requirement.

In one embodiment, the comparator 200 includes a comparator circuit A and a third resistor R3.

A first terminal of the comparator circuit A is connected with the air bag module 500, a second terminal of the comparator circuit A is connected with the first terminal of the first resistor circuit 100, a third terminal of the comparator circuit A is connected with a first terminal of the third resistor R3, a fourth terminal of the comparator circuit A is grounded, and a fifth terminal of the comparator circuit A is connected with a second terminal of the third resistor R3; a third terminal of the comparator circuit A is connected with a power supply, and a fifth terminal of the comparator circuit A is connected with the first terminal of the control switch 300.

In this embodiment, the third resistor R3 serves as current limitation. The third resistor R3 is connected between the power supply and the first terminal of the control switch 300 so as to limit the current on the circuit path connected between the power supply and the first terminal of the control switch 300.

In one embodiment, the second resistor circuit 400 may include a fourth resistor R4, and the fourth resistor R4 is connected between the power supply and the second terminal of the control switch 300. The fourth resistor R4 is a current-limiting resistor which is served as current limitation.

In one embodiment, the vehicle control device further includes a first port P1 configured to be grounded.

A third terminal of the first resistor circuit 100, a fourth terminal of the comparator 200 and a third terminal of the control switch 300 are commonly connected with the first port P1.

The comparator 200 is specifically configured to output a high level signal to the control switch 300 when receiving the first voltage, so that the control switch 300 is enabled to switch on the first port P1 and the battery management system 600 according to the received high level signal.

In this embodiment, the first port P1 of the vehicle control device is configured to be grounded. The third terminal of the first resistor circuit 100, the fourth terminal of the comparator 200, and the third terminal of the control switch 300 are grounded through the first port P1. When the comparator 200 outputs a high level signal to the control switch 300 after receiving the first voltage and enables the control switch 300 to switch on the first port P1 and the battery management system 600 according to the received high level signal, so that the battery management system 600 is grounded, and the battery management system 600 is powered off. When the comparator 200 receives the third voltage, the comparator 200 outputs a low level signal to the control switch 300, so that the control switch 300 switches off the first port P1 and the battery management system 600 according to the received low level signal, so that the battery management system 600 is powered by the power supply.

In one embodiment, the vehicle control device further includes a second port P2 connected with the battery management system 600.

A second terminal of the second resistor circuit 400 and a second terminal of the control switch 300 are commonly connected with the second port P2.

In this embodiment, the second port P2 of the vehicle control device is configured to be connected with the battery management system 600 externally, the second terminal of the second resistor circuit 400 and the second terminal of the control switch 300 are commonly connected with the battery management system 600 through the second port P2.

In one embodiment, the vehicle control device further includes a third port P3 configured to be connected with the power supply, and a fourth port P4 configured to be connected with the air bag module 500.

A third terminal of the comparator 200, a second terminal of the first resistor circuit 100, and a first terminal of the second resistor circuit 400 are commonly connected with the third port P3.

The first terminal of the comparator 200 is connected with the fourth port P4.

In this embodiment, the third port P3 of the vehicle control device is configured to be connected with external power supply. The third terminal of the comparator 200, the second terminal of the first resistor circuit 100 and the first terminal of the second resistor circuit 400 are commonly connected with the power supply through the third port P3. The fourth port P4 of the vehicle control device is configured to be connected with the first terminal of the air bag module 500 through the fourth port P4.

Figure 4:
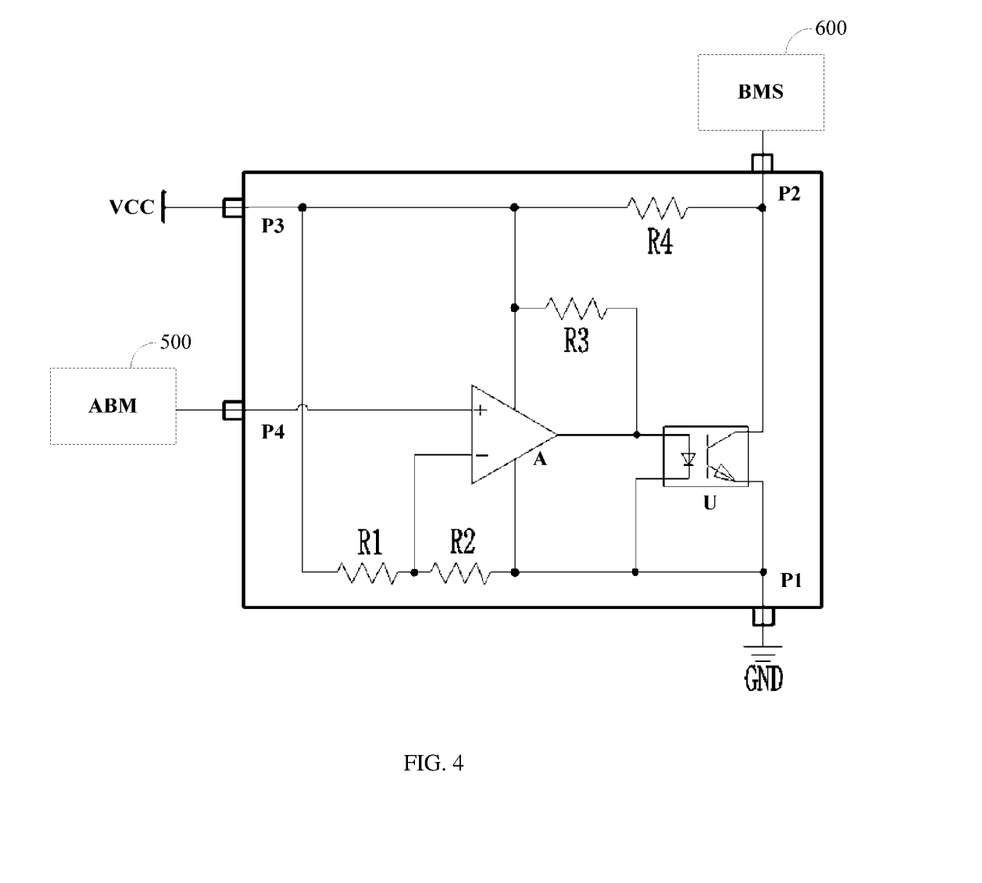
FIG. 4 illustrates a schematic circuit configuration of a vehicle control device according to another embodiment of the present disclosure.

FIG. 4 is a schematic circuit configuration of a vehicle control device according to another embodiment of the present disclosure. Referring to FIG. 4, in one embodiment, the control switch 300 is an optical coupler U; where a fourth terminal of the optical coupler U is grounded.

The model of the optical coupler U is not limited herein, for example, the model of the optical coupler U may be PC 817, or be PC 922, or the like. A first terminal and a fourth terminal of the optical coupler U are control terminals. When the first terminal of the optical coupler U receives a high level signal, the first terminal and the fourth terminal of the optical coupler U generates a conductive path, so that the second terminal and the third terminal of the optical coupler U are controlled to be turned on, and the battery management system 600 is grounded. When the first terminal of the optical coupler U receives a low level signal, the first terminal and the fourth terminal do not generate a conductive path, so that the second terminal and the third terminal of the optical coupler U are controlled to be switched off, thus, the battery management system 600 is powered by the power supply.

In this embodiment, the optical coupler is used as the control switch 300, such that a control circuit of the air bag module 500 can be isolated from a control circuit of the battery management system 600, a safety protection effect is achieved, and the reliability of the vehicle control device is improved.

As described above, when the vehicle control device in the embodiments of the present disclosure is collided, the air bag module (Air Bag Module, ABM) can directly cut off high-voltage of the vehicle by control based on hardware circuit without the CAN bus and the vehicle control unit (Vehicle Control Unit, VCU), thus, the vehicle control device has the at least advantages listed below:

1) Due to the fact that it is the ABM which directly cuts off high voltage of the vehicle, the time period lasting from the time when the ABM recognizes vehicle collision event to the time when vehicle is powered off is greatly reduced. According to experiments, the time period lasting from the time when the ABM recognizes the vehicle collision event to the time when the vehicle is powered off can be shortened to 30 ms or below 30 ms.

2) Due to the fact that the CAN bus does not participate, so that the problems that CAN signal is instable and is prone to be interfered and/or the transmission rate of the CAN signal is slow can be avoided.

3) Due to the fact the VCU does not participate, the amount of data to be processed by the VCU can be reduced, so that the VCU can perform more other operations.

4) The hardware circuit topology of the vehicle control device designed in the embodiments of the present disclosure is simple, is prone to be implemented, and is low in the cost of components.

5) In the embodiment of the present disclosure, the safety of the vehicle is improved as a whole, and the security of the driver can be guaranteed.

One embodiment of the present disclosure further provides a vehicle control system. The vehicle control system includes an air bag module 500, a power supply, and a vehicle control device according to the embodiments described above.

The air bag module 500 is configured to output a first voltage to the vehicle control device when a vehicle collision event occurs, so that the battery management system 600 is powered off.

Where when the first terminal of the comparator 200 in the vehicle control device is a non-inverting input, and the second terminal of the comparator 200 in the vehicle control device is an inverting input, the first voltage is higher than the second voltage, and the second voltage is the voltage input from the first terminal of the first resistor circuit 100 in the vehicle control device to the second terminal of the comparator 200. When the first terminal of the comparator 200 in the vehicle control device is an inverting input, and the second terminal of the comparator 200 in the vehicle control device is a non-inverting input, the first voltage is lower than the second voltage.

In one embodiment, the air bag module 500 is further configured to output a third voltage to the air bag module 500 when a vehicle collision event is not detected, so that the battery management system 600 is powered by the power supply.

Where when the first terminal of the comparator 200 in the vehicle control device is a non-inverting input, and the second terminal of the comparator 200 in the vehicle control device is an inverting input, the third voltage is lower than the second voltage. When the first terminal of the comparator 200 in the vehicle control device is an inverting input, and the second terminal of the comparator 200 in the vehicle control device is a non-inverting input, the third voltage is higher than the second voltage.

Referring the vehicle control system according to the embodiment of the present disclosure, regarding the implementation process of the vehicle control system, reference can be made to the embodiments of the vehicle control device described above, the implementation principle and the technical effects of the vehicle control system are similar to that of the vehicle control device, and are not repeatedly described herein.

A vehicle is further provided in one embodiment of the present disclosure. The vehicle includes the vehicle control system according to the aforesaid embodiments.

Referring to the vehicle provided by the embodiment of the present disclosure, regarding the detail of the implementation process of the vehicle control system, reference can be made to the embodiments of the vehicle control device and the vehicle control system described above, the implementation principle and the technical effects of the vehicle are similar to that of the vehicle control device and the vehicle control system, and are not repeatedly described herein.

As stated above, it should be noted that, the various embodiments described above are merely used to explain the technical solutions of the present disclosure, and are not intended to limit the technical solutions of the present disclosure. Although the present disclosure has been described in detail with reference to the embodiments described above, one of ordinary skill in the art should understand that the technical solutions described in these embodiments can still be modified, or some or all technical features in the embodiments can be replaced by equivalent technical features; however, these modifications or replacements do not make the essences of corresponding technical solutions to break away from the spirit and the scope of the technical solutions of the embodiments of the present disclosure.

What is claimed is:

1. A vehicle control device, comprising:
   a first resistor circuit, a comparator, a control switch, and a second resistor circuit;
   wherein a first terminal of the comparator is connected with an air bag module, a second terminal of the comparator is connected with a first terminal of the first resistor circuit, a third terminal of the comparator is connected with a power supply, a fourth terminal of the comparator is grounded, and a fifth terminal of the comparator is connected with a first terminal of the control switch;
   a second terminal of the control switch is connected with a battery management system, and a third terminal of the control switch is grounded;
   a second terminal of the first resistor circuit is connected with the power supply, and a third terminal of the first resistor circuit is grounded;
   a first terminal of the second resistor circuit is connected with the power supply, and a second terminal of the second resistor circuit is connected with the battery management system;
   the comparator is configured to receive a first voltage from the air bag module and output a high level signal to the control switch to enable the control switch to be switched on according to the high level signal, enable the battery management system to be grounded after the control switch is switched on, and enable the battery management system to be powered off after the battery management system is grounded, wherein the first voltage is sent out by the air bag module when a vehicle collision event is detected.

2. The vehicle control device according to claim 1, wherein when the first terminal of the comparator is a non-inverting input, and the second terminal of the comparator is an inverting input, the first voltage is higher than a second voltage, and the second voltage is a voltage input from the first terminal of the first resistor circuit to the second terminal of the comparator; when the first terminal of the comparator is an inverting input, and the second terminal of the comparator is a non-inverting input, the first voltage is lower than the second voltage.

3. The vehicle control device according to claim 2,
   wherein the comparator is further configured to receive a third voltage from the air bag module and output a low level signal to the control switch, so that the control switch is controlled to be switched off according to the low level signal, and the battery management system is powered by the power supply after the control switch is switched off, wherein the third voltage is sent out by the air bag module when the vehicle collision event is not detected by the air bag module;
   wherein when the first terminal of the comparator is a non-inverting input, the second terminal of the comparator is an inverting input, the third voltage is less than the second voltage; when the first terminal of the comparator is an inverting input, the second terminal of the comparator is a non-inverting input, the third voltage is higher than the second voltage.

4. The vehicle control device according to claim 1,
   wherein the first resistor circuit comprises a first resistor and a second resistor;
   a first terminal of the first resistor is connected with the power supply, a second terminal of the first resistor is connected with the first terminal of the second resistor, and a second terminal of the second resistor is grounded;
   the second terminal of the comparator is connected between the first resistor and the second resistor.

5. The vehicle control device according to claim 1,
   wherein the comparator comprises a comparator circuit and a third resistor;
   wherein a first terminal of the comparator circuit is connected with the air bag module, a second terminal of the comparator circuit is connected with the first terminal of the first resistor circuit, a third terminal of the comparator circuit is connected with a first terminal of the third resistor, a fourth terminal of the comparator circuit is grounded, and a fifth terminal of the comparator circuit is connected with a second terminal of the third resistor; the third terminal of the comparator circuit is connected with the power supply, and the fifth terminal of the comparator circuit is connected with the first terminal of the control switch.

6. The vehicle control device according to claim 1, further comprising a first port configured to be grounded;
   the third terminal of the first resistor circuit, the fourth terminal of the comparator and the third terminal of the control switch are commonly connected with the first port configured to be grounded;
   the comparator is configured to output a high level signal to the control switch so that the control switch is enabled to turn on the first port configured to be grounded and the battery management system according to the high level signal received from the comparator;
   the vehicle control device further comprises a second port configured to be connected with the battery management system;
   wherein the second terminal of the second resistor circuit and the second terminal of the control switch are commonly connected with the second port;
   the vehicle control device further comprises a third port configured to be connected with the power supply, and a fourth port configured to be connected with the air bag module;
   wherein the third terminal of the comparator, the second terminal of the first resistor circuit and the first terminal of the second resistor circuit are commonly connected with the third port;
   the first terminal of the comparator is connected with the fourth port.

7. The vehicle control device according to claim 1,
   wherein the control switch is a triode;
   as an alternative, the control switch is an optical coupler which further comprises a fourth terminal, wherein the fourth terminal of the optical coupler is grounded.

8. A vehicle control system, comprising: an air bag module, a power supply, and a vehicle control device comprising a first resistor circuit, a comparator, a control switch, and a second resistor circuit;

wherein a first terminal of the comparator is connected with the air bag module, a second terminal of the comparator is connected with a first terminal of the first resistor circuit, a third terminal of the comparator is connected with the power supply, a fourth terminal of the comparator is grounded, and a fifth terminal of the comparator is connected with a first terminal of the control switch;

a second terminal of the control switch is connected with a battery management system, and a third terminal of the control switch is grounded;

a second terminal of the first resistor circuit is connected with the power supply, and a third terminal of the first resistor circuit is grounded;

a first terminal of the second resistor circuit is connected with the power supply, and a second terminal of the second resistor circuit is connected with the battery management system;

the comparator is configured to receive a first voltage from the air bag module and output a high level signal to the control switch to enable the control switch to be switched on according to the high level signal, enable the battery management system to be grounded after the control switch is switched on, and enable the battery management system to be powered off after the battery management system is grounded, wherein the first voltage is sent out by the air bag module when a vehicle collision event is detected;

wherein the air bag module is configured to output the first voltage to the vehicle control device to switch off the battery management system through the vehicle control device when a vehicle collision event is detected; and wherein when the first terminal of the comparator in the vehicle control device is a non-inverting input, and the second terminal of the comparator in the vehicle control device is an inverting input, the first voltage is higher than a second voltage, and the second voltage is a voltage which is input from the first terminal of the first resistor circuit in the vehicle control device to the second terminal of the comparator; when the first terminal of the comparator in the vehicle control device is an inverting input, and the second terminal of the comparator in the vehicle control device is a non-inverting input, the first voltage is lower than the second voltage.

9. The vehicle control system according to claim 8, wherein the air bag module is further configured to output a third voltage to the vehicle control device, so that the battery management system is enabled to receive power supply from the power supply through the vehicle control device, when a vehicle collision event is not detected by the air bag module;

wherein when the first terminal of the comparator in the vehicle control device is a non-inverting input, and the second terminal of the comparator in the vehicle control device is an inverting input, the third voltage is higher than the second voltage; when the first terminal of the comparator in the vehicle control device is an inverting input, and the second terminal of the comparator in the vehicle control device is a non-inverting input, the third voltage is higher than the second voltage.

10. A vehicle, comprising the vehicle control system according to claim 8.

11. The vehicle control system according to claim 10, wherein the comparator is further configured to receive a third voltage from the air bag module and output a low level signal to the control switch, so that the control switch is controlled to be switched off according to the low level signal, and the battery management system is powered by the power supply after the control switch is switched off, wherein the third voltage is sent out by the air bag module when the vehicle collision event is not detected by the air bag module;

wherein when the first terminal of the comparator is a non-inverting input, the second terminal of the comparator is an inverting input, the third voltage is less than the second voltage; when the first terminal of the comparator is an inverting input, the second terminal of the comparator is a non-inverting input, the third voltage is higher than the second voltage.

12. The vehicle control system according to claim 8, wherein the first resistor circuit comprises a first resistor and a second resistor;

a first terminal of the first resistor is connected with the power supply, a second terminal of the first resistor is connected with a first terminal of the second resistor, and a second terminal of the second resistor is grounded;

the second terminal of the comparator is connected between the first resistor and the second resistor.

13. The vehicle control system according to claim 8, wherein the comparator comprises a comparator circuit and a third resistor;

wherein a first terminal of the comparator circuit is connected with the air bag module, a second terminal of the comparator circuit is connected with the first terminal of the first resistor circuit, a third terminal of the comparator circuit is connected with a first terminal of the third resistor, a fourth terminal of the comparator circuit is grounded, and a fifth terminal of the comparator circuit is connected with a second terminal of the third resistor; the third terminal of the comparator circuit is connected with the power supply, and the fifth terminal of the comparator circuit is connected with the first terminal of the control switch.

14. The vehicle control system according to claim 8, wherein the vehicle control device further comprises a first port configured to be grounded;

the third terminal of the first resistor circuit, the fourth terminal of the comparator and the third terminal of the control switch are commonly connected with the first port configured to be grounded;

the comparator is configured to output a high level signal to the control switch, so that the control switch is enabled to turn on the first port configured to be grounded and the battery management system according to the high level signal received from the comparator;

the vehicle control device further comprises a second port configured to be connected with the battery management system;

wherein the second terminal of the second resistor circuit and the second terminal of the control switch are commonly connected with the second port;

the vehicle control device further comprises a third port configured to be connected with the power supply, and a fourth port configured to be connected with the air bag module;

wherein the third terminal of the comparator, the second terminal of the first resistor circuit and the first terminal of the second resistor circuit are commonly connected with the third port;

the first terminal of the comparator is connected with the fourth port.

15. The vehicle control system according to claim 8, wherein the control switch is a triode;
as an alternative, the control switch is an optical coupler which further comprises a fourth terminal, wherein the fourth terminal of the optical coupler is grounded.

\* \* \* \* \*